United States Patent [19]
Wilmeth

[11] 3,802,458
[45] Apr. 9, 1974

[54] PIPELINE VENT INSERT
[76] Inventor: Joe Wilmeth, 5431 Rutherglinn, Houston, Tex. 77035
[22] Filed: Mar. 22, 1972
[21] Appl. No.: 237,098

[52] U.S. Cl.................. 137/363, 48/193, 137/312
[51] Int. Cl............................................. F17d 3/04
[58] Field of Search .......... 137/145, 155, 236, 312, 137/356, 363, 372, 454.2, 533.11, 540; 48/193

[56] References Cited
UNITED STATES PATENTS

| 3,385,382 | 5/1968 | Canalizo et al. | 137/155 X |
| 3,096,825 | 7/1963 | Clark | 137/533.11 X |
| 3,386,391 | 6/1968 | Garrett | 137/155 X |
| 2,218,988 | 10/1940 | Johnston et al. | 137/236 |
| 314,089 | 3/1885 | Westinghouse | 48/193 |
| 378,283 | 2/1888 | Brick | 48/193 |

Primary Examiner—Alan Cohan
Assistant Examiner—Gerald A. Michalsky
Attorney, Agent, or Firm—Arnold, White & Durkee

[57] ABSTRACT

Apparatus readily insertable in a pipeline vent duct to prevent back flow through the duct in a direction opposite to the direction of intended venting includes a check valve oriented to permit flow only in the venting direction, a gauge tube to aid in positioning the valve within the duct, and a flexible bushing sealing the peripheral region between the foregoing apparatus and the inner surface of the vent duct and holding the apparatus in place within the duct.

6 Claims, 2 Drawing Figures

PATENTED APR 9 1974 3,802,458

PIPELINE VENT INSERT

BACKGROUND OF THE INVENTION

The present invention relates generally to apparatus for the protection of pipelines, and, more particularly, to apparatus for the prevention of air flow through, and introduction of other materials into, vented pipeline casings.

Safety regulations regarding underground pipelines require that, when such pipelines cross beneath roads, railway right-of-ways, and the like, a protective casing surround the pipeline and span the road or other right-of-way. These casings must be vented to the atmosphere to prevent the buildup of high pressures therein, should a leak develop in the pipeline within the casing, and a vent pipe typically is provided at each end of such casings for this purpose. These pipeline casing vents typically are 2 to 4 inch pipes extending from the top of the casing to a point several feet above grade. The upper end of the vent terminates in a hat, 180° elbow, or other fitting intended to prevent rain, dust, and other materials from entering the casing directly through the vent. Each end of the casing is sealed to the pipeline by an annular plug. The casing also may contain structures to support the pipeline concentrically with the casing.

Corrosion of pipelines within the casings has been recognized as a problem by the pipeline industry. This corrosion results primarily from the accumulation of water within the casings, due to condensation of moisture from the air within the casings and leakage of the annular seals at each end of the casing. A particularly corrosive environment is produced where this moisture is combined with a free flow of air through the casing annulus, entering through a vent at one end of the casing and exiting through a vent at the other end.

In recent times, incidents of vandalism involving removal of fittings from the upper ends of casing vents have increased, and it is not unknown for vandals to drop explosives into a pipeline casing through a vent pipe. The possibilities of increasing vandalism and the introduction into pipeline casings of other dangerous materials have created a very serious problem.

Preventing air flow through, and introduction of other materials into, pipeline casings cannot be achieved by simply sealing off the vents, because the vents are required for safety reasons. The installation of check relief valves in the vents above grade would be effective to prevent air flow through the casings, and would be of some effect in the prevention of vandalism, but such vents could be cut off below the valves. For this reason, installation of the valves below ground level is preferred. Check relief valves presently available which might be installed in vent pipes are quite expensive. Installation of such valves into the vent pipes, requiring the making of threaded or welded joints in the pipe, would likewise be expensive. Further, the addition of such valves below grade in the thousands of existing pipeline casing vents would involve a prohibitive cost.

Accordingly, it is one object of this invention to provide apparatus for insertion into vent pipes to prevent the flow of air through or the introduction of foreign material into pipeline casings through such vent pipes.

It is another object of this invention to provide a simple, inexpensive, and easily installed check valve apparatus for insertion within pipeline vent ducts and the like.

It is a further object of the present invention to provide apparatus including a check valve assembly for preventing the free circulation of air through pipeline casings to substantially reduce corrosion of pipelines within such casings.

It is another object of this invention to provide check valve apparatus adapted to be readily inserted into and positioned within a pipeline vent duct to limit flow through that duct to the direction of venting.

It is still another object of this invention to provide a simple, inexpensive check valve apparatus for ready insertion into a pipeline vent duct and which, when placed in such a duct, is difficult to remove.

It is among the further objects of this invention to provide check valve apparatus which may be inserted into a vent duct and easily positioned therein at a predetermined position with respect to the ground surface level or other reference point.

SUMMARY OF THE INVENTION

The foregoing objects, as well as others which will become apparent, are achieved by the present invention, wherein a vent insert includes a check valve oriented to permit flow only in the direction of the intended venting, means for gauging the position of the valve with respect to a known reference, and means for sealing the valve within the vent to prevent bypassing of the valve by any material flowing through the vent.

The vent insert of the present invention typically consists of a simple ball-type check relief valve mounted at one end of a 2 to 4 foot length of heavy plastic tubing or plastic pipe. The pipe may be diagonally cut at its opposite end, at for example a 45° angle, so that when the end of the tubing or pipe strikes an obstruction, the inlet to the check valve will not be blocked. The tube length is selected to serve as a gauge, such that when the valve assembly is inserted into a vent duct or pipe the apparatus can be moved axially through the vent until the end of the gauge tube strikes a known obstruction. In the case of pipeline road crossing casing vents, the obstruction typically will be the pipeline itself, and the length of the gauge tube usually will be selected to place the valve portion of the assembly well below ground level, preferably about 4 to 5 feet below.

The valve assembly is supported and sealed within the vent by a flexible plug or bushing which surrounds the gauge pipe and forms a seal between the gauge pipe and the inner periphery of the vent. This bushing serves several purposes including supporting the apparatus within the vent, sealing the peripheral space between the apparatus and the inner surface of the vent, and retaining the apparatus within the vent, rendering its removal difficult.

BRIEF DESCRIPTION OF THE DRAWINGS

The manner in which the above objects and advantages of this invention, as well as others which will become apparent, are attained is explained more particularly in the following specification describing the present invention with reference to the accompanying drawings.

DESCRIPTION OF PREFERRED EMBODIMENTS

Figure 1:
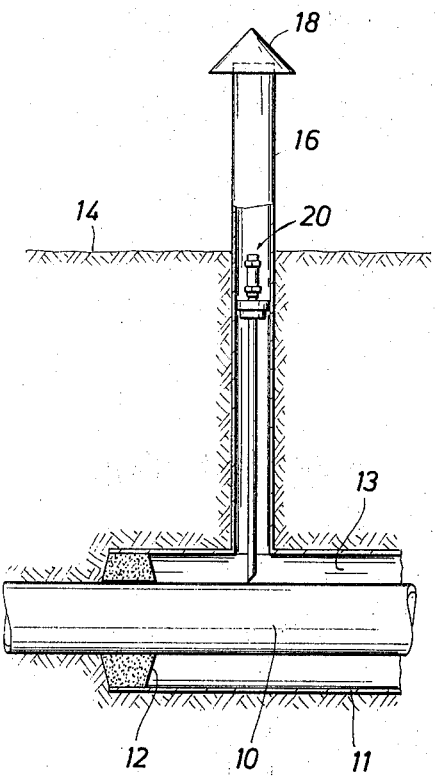
FIG. 1 is a schematic sectional view of a typical pipeline casing vent into which apparatus in accordance with the present invention has been placed.

FIG. 1 represents one end of a typical pipeline casing having a vent containing apparatus in accordance with the present invention. An underground pipeline 10 passes through a casing 11, the annular region 13 between the pipeline and the casing being sealed at the end of the casing by an annular seal 12. A vent pipe 16 extends vertically from the casing 11 to a point several feet from grade level 14 to provide a path of communication between the annular region 13 and the atmosphere. A hat fitting 18 is connected to the top of the vent pipe 16 for the purpose of keeping dust and rain from entering the vent pipe. Apparatus in accordance with the present invention, generally indicated by reference numeral 20 and hereinafter described, is preferably positioned with its uppermost end slightly below ground level.

Figure 2:
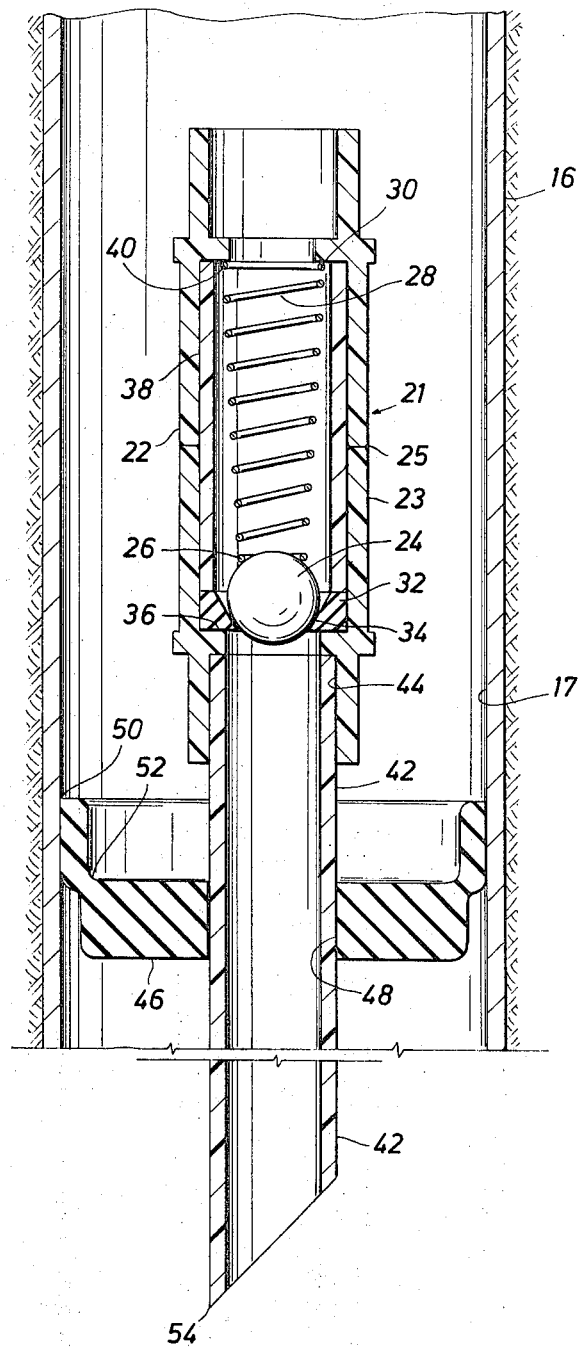
FIG. 2 is a cross sectional view of one embodiment of apparatus in accordance with the present invention.

FIG. 2 illustrates one embodiment of apparatus in accordance with the present invention installed within a section of vent pipe 16. A check relief valve 21 is mounted on the uppermost end of a gauge tube 42, and gauge tube 42 is surrounded by bushing 46 as shown.

In the illustrated embodiment of the present invention, valve 21 includes upper and lower body elements, 22 and 23, respectively, joined to one another at mating annular faces, generally indicated by reference numeral 25 to define a valve body having a central bore with oppositely facing, annular shoulders 40 and 36, respectively. An annular, tapered valve seat 32 is supported by the upwardly facing shoulder 36 in lower body element 23. A ball 24 sits in seat 32 to form a seal between the two as indicated by reference numeral 34. The lower end 26 of a spring 28 contacts the ball, and the upper end 30 of the spring 28 is restrained by downwardly facing seat 40 of the upper body member 22, maintaining the spring 28 in compression to force the ball 24 against the seat 32.

The spring 28 may be connected at its lower end 26 to the ball 24, if desired, and such an arrangement will prevent rotation of the ball 24 as the valve cycles in operation. The ball 24 is typically of a rubber or plastic compound which slightly deforms, elastically, under the force of the spring 28 to assure a positive seal against the seat 32. Of course, it will be appreciated that a similar effect may be achieved by the use of a relatively hard ball in a softer seat. Similarly, the biasing effect of the spring 28 to hold the ball 24 in the seat 32 may be achieved in a vertically oriented valve by the use of a relatively heavy ball, such as of steel, and a somewhat more flexible seat, such that the force of gravity acting on the ball will produce the desired seal between the two elements.

The seat 32 may be of any suitable material, the selection of which will be greatly influenced by the material of the ball 24, and such ball-seat combinations are well known in the valve art. The valve body elements 22 and annular insert 38 may be of polyvinylchloride or like plastic materials which may conveniently be assembled by solvent bonding, or of other suitable materials. Although the insert 38 is not necessary to the valve as presently described, solvent bonding between the outer surface of the insert 38 and the inner surface of the housing elements enables construction of a valve of great rigidity. Insert 38 also provides a smooth inner surface for the valve. It will be understood that although the valve illustrated in the present embodiment is of the ball type, other types of check valves, such as flapper valves and the like, may be used in the present invention. The low level of back pressure usually present and acting against the outlet side of the check valve renders preferable in most applications the use of a valve biased to remain firmly closed when no venting is occurring.

The valve 21 is joined to the upper end of a section of cylindrical pipe or tube 42. The use of plastic materials in the valve body and tube will permit the inner surface 44 of the lower end of the valve 21 to be solvent bonded to the outer peripheral surface of the upper end of the tube 42. The tube 42 may be of any suitable length, but this length is preferably selected such that, when the assembled apparatus of this invention is inserted within a pipeline casing vent until the lower end of the tube 42 strikes the pipeline, the top of the valve 21 is well below ground level. Note that the lower end of the tube 42 terminates at an angle of about 45°, although greater or lesser angles will suffice, so that when the lower end 54 of the tube 42 contacts an obstruction, the obstruction will not block the opening in the lower end of the tube. It will be appreciated that other means for keeping the lower end of the tube 42 unblocked when it contacts an obstruction may be used, for example providing an opening in the side of the tube above its lower end.

The tube 42 passes through a central opening in a flexible bushing 46. The inner surface 48 of the opening in the bushing has a periphery slightly smaller than the outer periphery of the tube 42, so that when the bushing surrounds the tube a tight seal is formed between the two. The flexible bushing 46 has an outer periphery which is normally slightly greater than the periphery of the inner surface 17 of the vent pipe 16, so that upon insertion of the bushing into the vent pipe, the outer peripheral edge 50 of the bushing will press tightly against the inner surface of the vent pipe. In the bushing illustrated, flexing occurs at a neck region 52 to produce a peripheral rim or band in contact with the inner surface of the vent pipe. It will be appreciated that other known bushing structures may be utilized in the apparatus of the present invention, and such structures are well known and readily available. The structure of the flexible bushing 46 as illustrated is particularly effective in the present invention because the tendency for the rim 50 to flex inwardly when the bushing is being moved in a downwardly direction is reversed when force is applied to the bushing in an upwardly direction. An attempt to move the illustrated apparatus in an upward direction will tend to force the edge 50 even more tightly against the inner surface 17 of the vent pipe, making such removal of the apparatus quite difficult.

The bushing 46 forms a tight seal in the annulus between the tube 42 and the vent pipe. By plugging or blocking this annular area, all flow through the vent pipe must pass through the check relief valve 21, and may occur only in an outwardly direction from the pipeline casing annulus. The bushing 46 may be made of any suitable sealing material and may be made of a relatively rigid, flexible material. A degree of rigidity, or tendency of the flexed material to return to its initial shape, is desirable to produce a tight seal between the tube 42 and the inner surface 17 of the vent pipe. Neoprene rubber has been found particularly effective in this application due to its resistance to chemical attack and weathering, but other materials having similar properties may equally as well be used.

The use of a tube 42, notwithstanding its value as a gauge pipe, improves the effectiveness of the seal between the valve 21 and the bushing 46. Of course, the bushing 46 might be placed with its inner surface surrounding the body of the valve 21, and the gauge tube 42 eliminated. This would result in an effective check relief valve which might be inserted and positioned within a vent pipe. Sacrificed, however, together with the gauging feature, would be the high resistance to further downward movement of the bushing that is offered by the embodiment of FIG. 2, once the lower end of the gauge tube encounters an obstruction. The valve cannot be moved further down the vent pipe when the lower end of the tube rests on an obstruction, and movement of the bushing is resisted over the bushing-tube contact area as well as over the bushing-pipe contact area. Accordingly, vent protecting apparatus without the tube might be forced downardly through a vent duct such as illustrated in FIG. 1 until the valve entered the annulus 13 between the pipeline and the casing, where the apparatus would be of no further value in protecting the pipeline.

It will be appreciated that pipeline vent protective apparatus should have a long, maintenance-free service life. This is particularly so for apparatus in accordance with the present invention, since such apparatus is removable from pipeline casing vents only with substantial difficulty. Accordingly, the preferred materials for use in apparatus in accordance with this invention will be highly resistant to corrosion to enhance service life. The spring 28 is preferably resistant to both corrosion and fatigue, for the same reason. Use of plastic materials, such as polyvinylchloride and neoprene as well as other suitable plastics, is helpful in assuring this long service life. Even the spring 28 may be of plastic, although other suitable corrosion resistance spring materials may, of course, be used, to produce pipeline vent protective apparatus in accordance with the present invention of all-plastic construction.

Installation of the apparatus of the present invention within a pipeline casing vent involves merely the removal of the hat or other fitting at the upper end of the vent and insertion into the vent of the present apparatus. It will be appreciated that this apparatus must have a flexible bushing of appropriate diameter or other cross section to fit tightly within and in contact with the inner surface of the vent. The present apparatus is then forced downwardly in the vent pipe by, for example, use of a piece of tubing having an inner diameter large enough to pass over the body of the valve 21 and rest on the bushing 46, and an outer diameter small enough to pass within the vent pipe 16. The bushing 46 is pushed downwardly until the lower end 54 of the guide tube 42 strikes the pipeline. The length of the guide tube 42 is preferably chosen such that when its lower end strikes the pipeline 10 the upper end of the body of the valve 21 is well below ground level. When the apparatus of the present invention is placed in such a position within a vent, it will provide protection even if the vent pipe should be cut off at ground level by vandals in an attempt to introduce foreign or dangerous material into the casing annulus.

Should a leak develop in the pipeline within the casing, the leaking fluid will flow upward through the tube 42 and the valve 21 and thence out through the upper end of the vent pipe 16. The amount of pressure which must be applied to the lower surface of the ball 24 to move the ball out of the seat 32 and permit passage therebetween of the leaking fluid will be dependent upon the stiffness of the spring 28 and the degree to which it is compressed, or, if a weighted ball is used, the weight of the ball. When the internal pressure reaches this level, the valve 21 opens and permits the venting of such material.

While the invention has been described with respect to pipeline casing vent protection, it is also applicable to prevention of flow inwardly through similar kinds of vents. The principles of the present invention may likewise be applied to pipeline vent ducts of various cross sections and having various venting flow conditions, and the cross sections of the valve and the vent tube may likewise be varied. It will be understood that the foregoing variations, as well as others, may be made in the illustrative embodiment of this invention without departing from the spirit and scope thereof.

What is claimed is:

1. Protective apparatus for insertion in a pipeline casing vent comprising:
    a check valve insertable in a pipeline casing vent to permit fluid flow outwardly of the vent;
    a rigid member extending a predetermined distance from said valve for locating said valve with respect to a fixed object; and
    flexible bushing means disposed in relation to said valve for preventing passage of material around said valve in the vent and for securing said valve against removal from the vent, said bushing means including:
    a first annular region having an outside diameter slightly smaller than the inside diameter of the vent;
    a second annular region having an outside diameter normally slightly greater than the inside diameter of the vent; and
    a flexible neck region joining the first and second annular regions for permitting the second annular region to move inwardly and seal against the vent when the bushing means is moved into the vent in the direction of the first annular region, and for permitting the first annular region to wedge against the second annular region to resist withdrawal from the vent when force is applied to move said bushing means in the opposite direction;
    wherein the outer periphery of said valve is sufficiently small with respect to the inside diameter of the second annular region of said bushing means to permit passage of a section of pipe axially over said valve for application of force to the first annular region of said bushing means without applying the force directly to said valve.

2. Protective apparatus slidably insertable in a pipeline casing vent, comprising:
    a check valve insertable from a location above ground to a location below ground in a pipeline casing vent, said valve having an inlet and an outlet;

a rigid tube extending a predetermined distance from the inlet of said valve, said tube having an interior bore communicating with the inlet of said valve and a radial opening remote from said valve; and a flexible bushing surrounding said tube between said opening and the valve inlet to prevent passage of material around said valve in the vent, said bushing including a first annular region proximate said tube and having an outside diameter slightly less than the inside diameter of the vent, a second annular region having an outside diameter normally slightly greater than the inside diameter of the vent, and a flexible neck region joining the first and second annular regions to permit the second annular region to flex inwardly to seal against the vent when the bushing is moved into the vent in the direction of the first annular region, and to permit the first annular region to wedge against the second annular region and resist withdrawal of said bushing from the vent when force is applied to move said bushing in the opposite direction;

said valve having a outer periphery sufficiently small with respect to the inside diameter of the second annular region of said bushing to permit passage of a section of pipe axially over said valve and against the first annular region of said bushing for applying force to move said bushing within the vent without applying said force directly to said valve.

3. Protective apparatus slidably insertable in a pipeline casing vent as recited in claim 2, wherein said valve includes a first generally cylindrical plastic valve body member defining a valve outlet and having an inwardly facing shoulder;

a second generally cylindrical plastic valve body member defining a valve inlet and supporting an inwardly facing tapered annular seat adapted to receive a ball;

said first and second body members abutting one another and rigidly joined by a coaxial cylindrical sleeve extending from the inwardly facing shoulder to the annular seat; and a flexible ball biased to seat in the tapered seat by a compressed spring, said spring being supported by the shoulder.

4. In apparatus for protecting roadway and railway crossings of underground pipelines, including a casing surrounding the pipeline and at least one vent extending from the casing to a termination point above ground to permit pipeline leaks to be vented to the atmosphere, the improvement comprising:

a check valve slidable through the vent from a location above ground to a location below ground, said valve having an inlet and an outlet;

a rigid tube extending a predetermined distance from the inlet of said valve to limit movement of said valve into the vent, said tube having a central bore communicating with the inlet of said valve and a radial opening communicating with the bore remote from the valve; and flexible bushing means disposed with respect to the valve inlet for preventing passage of material around said valve in the vent and for securing said valve against removal from the vent, said bushing means being substantially more resistant to withdrawal from the vent than to insertion into the vent.

5. Apparatus as recited in claim 4, wherein said flexible bushing means comprises a first annular bushing region surrounding said tube and having an outside diameter slightly smaller than the inside diameter of the vent, a second annular bushing region having an outside diameter slightly greater than the normal inside diameter of the vent, said first and second annular regions being joined by a flexible neck region for permitting the second region to move radially inwardly relative the vent and to seal against the vent when said bushing means is moved in the direction of the first annular region into the vent and for permitting the first annular region to wedge against the second annular region to resist movement when force is applied to move said valve in the opposite direction.

6. Apparatus as recited in claim 5, wherein the outer periphery of said valve is sufficiently small relative the inside diameter of the second annular region of said bushing means to permit passage of a section of pipe axially over said valve and within the second annular region to apply force to the first annular region of said bushing means to move said apparatus in the direction of the first annular region within the vent.

* * * * *